(12) United States Patent
Durbic

(10) Patent No.: US 7,357,222 B2
(45) Date of Patent: Apr. 15, 2008

(54) ENERGY ABSORBER FOR HORIZONTAL LIFELINE SYSTEM

(75) Inventor: Toma Durbic, Etobicoke (CA)

(73) Assignee: Thaler Metal Industries Ltd., Mississauga, Ontario (CA)

( * ) Notice: Subject to any disclaimer, the term of this patent is extended or adjusted under 35 U.S.C. 154(b) by 306 days.

(21) Appl. No.: 11/059,993

(22) Filed: Feb. 17, 2005

(65) Prior Publication Data

US 2006/0016636 A1    Jan. 26, 2006

(30) Foreign Application Priority Data

Jul. 23, 2004   (CA) .................................. 2475829
Nov. 26, 2004   (CA) .................................. 2489107

(51) Int. Cl.
   *A62B 35/00*   (2006.01)
(52) U.S. Cl. ........................................... 182/3; 188/375
(58) Field of Classification Search ................... 182/3, 182/18; 188/371, 375; 280/805
   See application file for complete search history.

(56) References Cited

U.S. PATENT DOCUMENTS

| 3,106,989 | A | * | 10/1963 | Fuchs .......................... 188/375 |
| 3,444,962 | A | * | 5/1969  | Lech ........................... 188/371 |
| 3,820,843 | A | * | 6/1974  | Seo et al. .................... 297/472 |
| 5,197,573 | A |   | 3/1993  | De La Fuente et al. ...... 188/67 |
| 5,455,989 | A | * | 10/1995 | Roy ............................. 16/376 |
| 5,464,252 | A | * | 11/1995 | Kanazawa et al. .......... 280/805 |
| 5,598,900 | A |   | 2/1997  | O'Rourke ....................... 182/3 |
| 5,799,760 | A | * | 9/1998  | Small .......................... 188/371 |
| 6,279,680 | B1 | * | 8/2001 | Casebolt ........................ 182/3 |
| 2004/0145098 | A1 |   | 7/2004 | Thaler .......................... 267/33 |

FOREIGN PATENT DOCUMENTS

DE                4005563 A1 *  8/1991

* cited by examiner

*Primary Examiner*—Alvin Chin-Shue
(74) *Attorney, Agent, or Firm*—Kusner & Jaffe

(57) ABSTRACT

The invention provides an energy absorber for use in a horizontal lifeline system comprising an elongated non-elastic plate folded onto itself to form adjoining lower wall portions, adjoining intermediate wall portions perpendicular to the said lower wall portions, and opposed flanges in perpendicular relationship to said intermediate wall portions. The opposed flanges have means for receiving connecting devices of the horizontal lifeline cable and an end anchor of the horizontal lifeline system. The adjoining lower and intermediate wall portions are secured together with a plurality of distinct fasteners such that when a tension shock load produced in the horizontal lifeline cable by arresting a fall acts in the longitudinal direction of one of the opposed flanges, the fasteners deform, pull apart and fracture, and the plate transforms into an unfolded state.

8 Claims, 7 Drawing Sheets

ENERGY ABSORBER FOR HORIZONTAL LIFELINE SYSTEM

FIELD OF THE INVENTION

The present invention relates to the field of fall protection systems, and particularly, to an energy absorber for use in a horizontal lifeline system.

BACKGROUND OF THE INVENTION

It is known to provide horizontal lifeline safety systems for workers on elevated structures.

Such fall protection systems commonly consist of a horizontal lifeline anchored at its ends to a building structure, including ceilings, walls and roof structures, and supported intermittently along its length by intermediate supports. Persons working in the vicinity of the lifeline may don a safety harness or belt and moveably attach to the horizontal lifeline via one or more mobile attachment devices. The mobile attachment devices freely move along the horizontal lifeline, including across the intermediate supports.

It is well known to include means for absorbing energy in such horizontal lifeline systems, so as to ensure that the maximum arrest forces exerted upon persons using such fall protection systems do not exceed physically injurious levels, and also to reduce the force placed on the anchorages therefor to manageable levels.

In modern fall protection systems, it is most common to utilize a substantially inelastic lifeline and to delegate energy absorption functionality to separate energy absorption apparatus that does not exhibit undesirable rebound.

Energy absorption apparatus interposed between a horizontal lifeline and its anchorage are most commonly termed "energy absorbers", and energy absorption apparatus interposed between a lanyard and a harness are most commonly termed "shock absorbers" but the terms are used somewhat interchangeably in the art, and indeed; many types of energy absorption apparatus are used interchangeably (to wit, in both applications). Accordingly, such apparatus are hereinafter referred to universally as "energy absorbers" for simplicity.

U.S. Pat. No. 5,598,900 (O'Rourke), issued Feb. 4, 1997, exemplifies one class of energy absorber of the prior art. In this energy absorber, a pair of rings is provided, which are secured to one another by a strip of tear-ply webbing material and by a strip of woven webbing material.

In a fall, the tear-ply webbing separates incrementally, with consequent absorption of energy, until such time as the energy absorber elongates to the length of the woven webbing material, whereupon elongation stops, and further loading is borne by the woven webbing material.

This energy absorber is known to be relatively inexpensive to manufacture, and to provide satisfactory energy absorption, but, by virtue of its nature, is useful only for a single use, which is disadvantageous inter alia from the standpoint of economy.

U.S. Pat. No. 5,197,573 (De La Fuente et al.), issued Mar. 30, 1993, exemplifies another class of energy absorber.

This energy absorber, which is of all metal construction, and which dissipates kinetic energy in a fall by rolling balls which are forced by a tapered surface on an expandable sleeve to frictionally load a force rod, is suitable for repetitive use, and as such, overcomes some of the drawbacks of the class exemplified by the O'Rourke patent, but is of relatively complex and expensive construction.

US Patent Publication No. 20040145098 to Thaler, provides an energy absorber comprising a housing, a plunger and a compressible cushion. This energy absorber is suitable for repetitive use, and as such, overcomes some of the drawbacks of the class exemplified by the O'Rourke patent, but is of relatively more expensive construction.

SUMMARY OF THE INVENTION

An advantage of the present invention is an energy absorber for use in a horizontal lifeline system, which is of relatively simple and inexpensive construction as compared to devices of similar functionality of the prior art.

This advantage, among others, is attained by the present invention, an energy absorber for use in a horizontal lifeline system.

The invention provides an energy absorber for use in a horizontal lifeline system comprising an elongated non-elastic plate folded onto itself to form adjoining lower wall portions, adjoining intermediate wall portions perpendicular to the said lower wall portions, and opposed flanges in perpendicular relationship to said intermediate wall portions. The opposed flanges have means for receiving connecting devices of the horizontal lifeline cable and an end anchor of the horizontal lifeline system. The adjoining lower and intermediate wall portions are secured together with a plurality of distinct fasteners such that when a tension shock load produced in the horizontal lifeline cable by arresting a fall acts in the longitudinal direction of one of the opposed flanges, the fasteners deform, pull apart and fracture or shear, and the plate transforms into an unfolded state.

In one embodiment of the invention, the non-elastic plate is made of stainless steel. The connecting fasteners are rivets and also made of stainless steel. The energy absorber of the present invention may optionally be coated with polymer coatings.

In use, the flange portions of the energy absorber are conventionally secured by respective carabiners or quick links, so as to operatively interpose the energy absorber between an anchorage point for the horizontal lifeline system and a horizontal lifeline.

The horizontal lifeline system includes one or more mobile attachment devices that the worker attaches to with a safety line. The mobile attachment devices move freely along the lifeline including past the intermediary supports.

In a fall situation, a tension load is applied to the horizontal lifeline, which in turn is transmitted to the opposing flanges of the energy absorber. As the load is applied, the folded adjoining intermediate and lower walls begin to be drawn apart by the load of the falling worker. As the force continues, some of the rivets connecting the adjoining walls start to deform and pull apart and some eventually break such that the energy absorber transforms towards its unfolded state. The action by the rivets effectively retards or dampens the rate at which the adjoining walls of the energy absorber are drawn apart, thereby reducing the maximum arrest force exerted on the falling worker, and decreasing loads on the anchorage.

Other advantages, features and characteristics of the present invention, as well as methods of operation and functions of the related elements of the structure, and the combination of parts and economies of manufacture, will become apparent upon consideration of the following detailed description and the appended claims with reference to the accompanying drawings, the latter of which are briefly described hereinafter.

BRIEF DESCRIPTION OF THE DRAWINGS

The present invention may be further understood by reference to the following detailed description of the embodiments of the invention, taken in conjunction with the accompanying drawings, in which.

Figure 1:
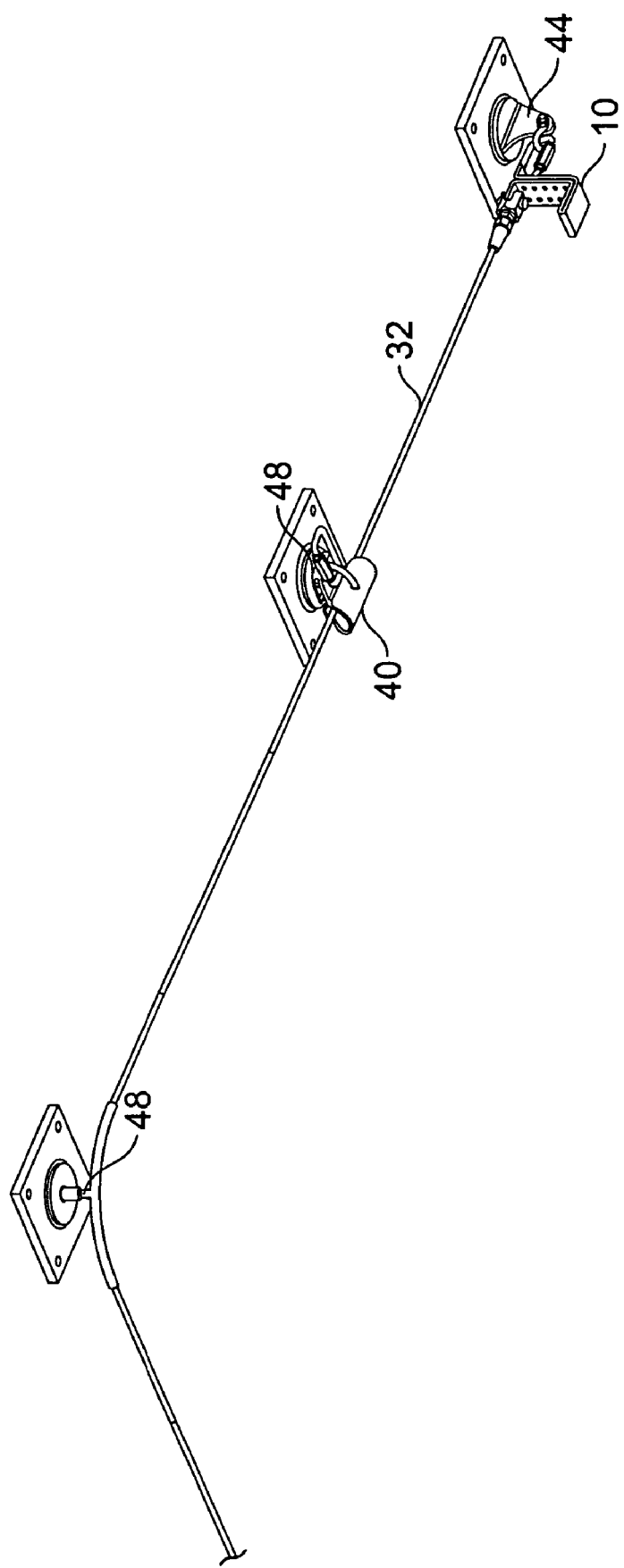
FIG. 1 is an elevational perspective view of a section of a ceiling mounted horizontal lifeline system showing use of the energy absorber of the present invention.

Although the above description and accompanying drawings relate to specific preferred embodiments of the present invention as presently contemplated by the inventor, it will be understood that various changes, modifications and adaptations may be made without departing from the spirit of the invention.

DETAILED DESCRIPTION OF PREFERRED EMBODIMENT

Referring now generally to FIGS. 1, 2, 3 and 6 of the drawings, an energy absorber, for use in a horizontal lifeline system and according to a preferred embodiment of the present invention is shown and designated with general reference 10.

The energy absorber 10 is comprised of an elongated non-elastic plate 1 folded to form adjoining lower walls 12 and 14, adjoining intermediate walls 16 and 18 perpendicular to the lower walls, and opposed flanges 20 and 22 in perpendicular relationship to the intermediate walls. The opposed flanges 20 and 22 are provided with apertures 24 and 26.

The adjoining lower and intermediate walls are secured together with a plurality of distinct fasteners 28. At least two parallel rows of fasteners 28 are provided on the said adjoining lower and intermediate wall portions. The fasteners are preferably corrosion resistant metal rivets.

Figure 3:
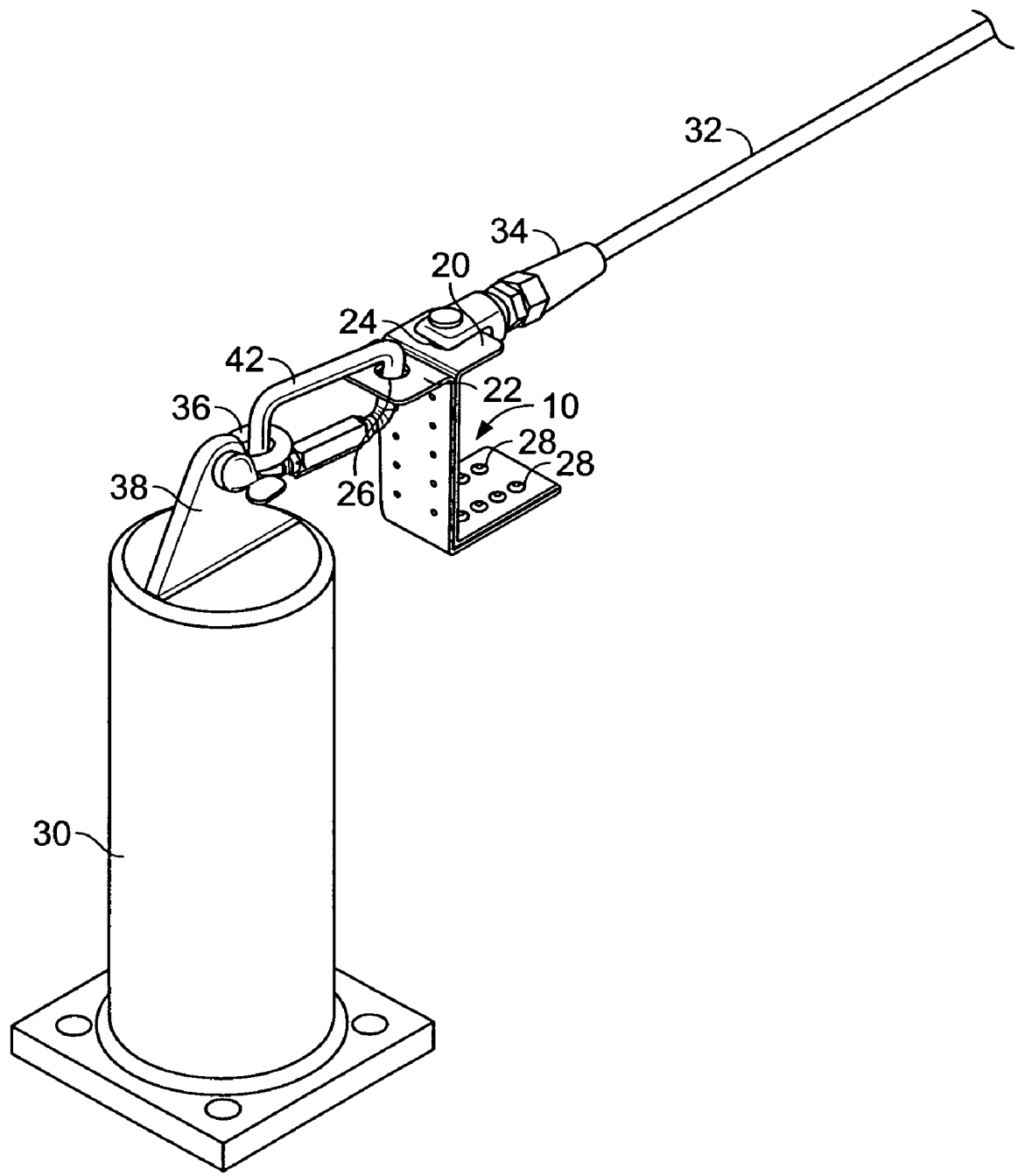
FIG. 3 is a perspective view of the energy absorber of the present invention situate in a horizontal lifeline system secured to a fall arrest roof anchor.

As indicated in FIG. 3, the energy absorber 10 is shown in use in a horizontal lifeline system such as one that may be employed on a building roof (not shown) or similar structure. The energy absorber 10 is conventionally secured to an end anchor support 30 and the horizontal lifeline cable 32 so as to operatively interpose the energy absorber 10 between the end anchor support 30 and the horizontal lifeline cable 32. The lifeline cable 32 is secured to a swaged end connection 34 that is in turn secured through aperture 24 of flange 20. A shackle 36 is secured to the receiving projection 38 of the lifeline end support 39. A carabiner or snap ring 42 is secured at one end to the shackle 36 and at the other end to the aperture 26 of flange 22.

Figure 7:
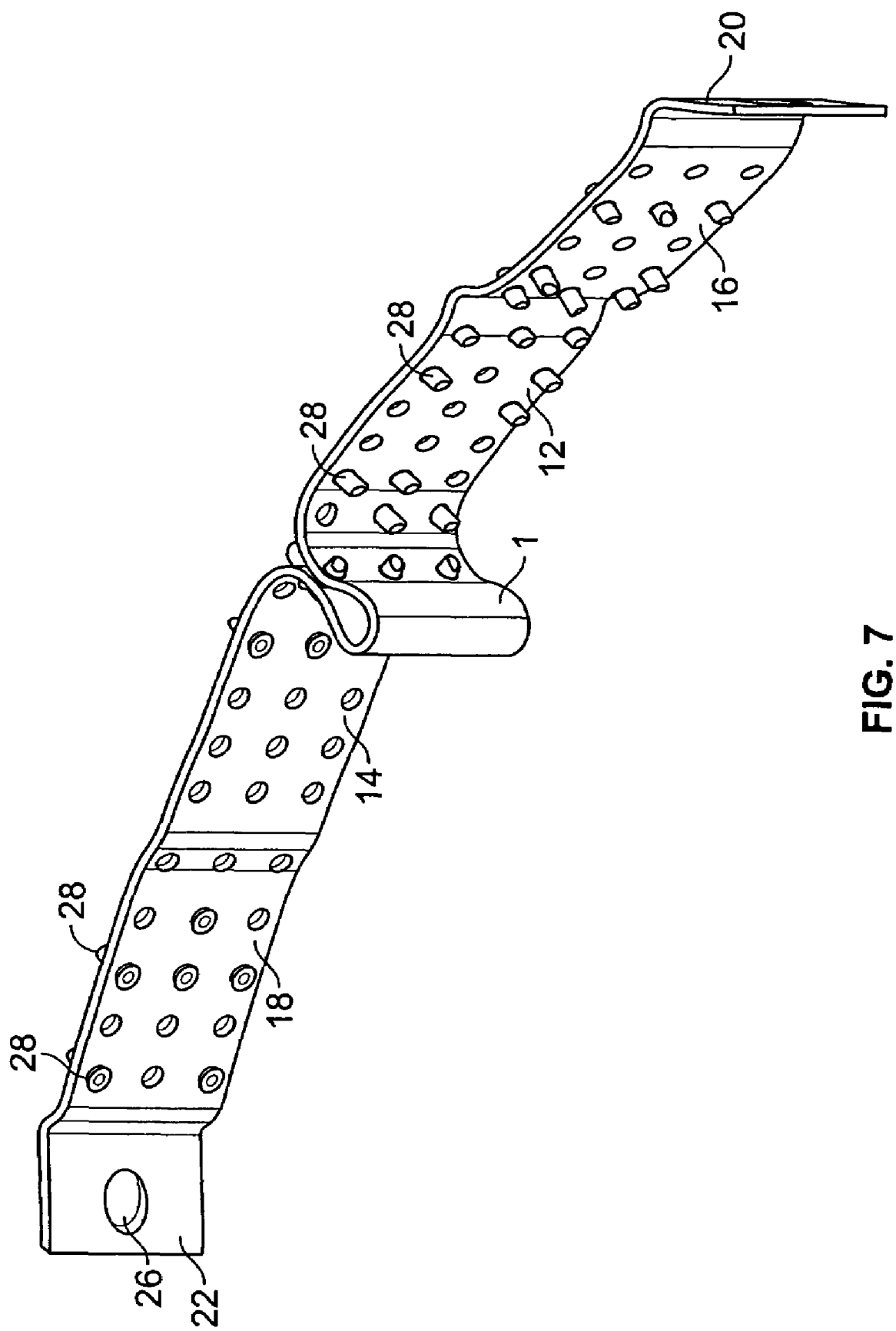
FIG. 7 is a view of the energy absorber of the present invention in a deformed state after a fall situation.

In a fall situation, a falling person creates a force upon a mobile attachment device 40, which force in turn is transmitted to the horizontal lifeline cable 32 thereby creating a tension shock load in the longitudinal direction of opposed flange 20 of the energy absorber 10. As the load created by the falling worker continues to be applied to the opposed flange 20 of the energy absorber 10, some of fasteners 28 deform, and if the load continues the opposed flanges 20, 22 pull apart and in turn some fasteners 28 pull apart and fracture, and the plate 1 transforms into an unfolded state. The kinetic energy from the fall is reduced or negated by the aforesaid deformation, fracturing and unfolding transformation of the energy absorber 10. FIG. 7 shows the energy absorber 10 in an unfolded state removed from the horizontal lifeline system. Fasteners 28 are sheared, fractured or broken. After a fall arrest occurrence a new energy absorber is installed in the horizontal lifeline system.

Referring now to FIG. 1, the energy absorber 10 is shown in use in a horizontal lifeline system such as one employed on an overhead ceiling (not shown) structure. Only part of the overall system is shown. The horizontal lifeline system generally comprises an end anchor support 44 and several intermediate anchor supports 48, which support the horizontal lifeline cable 32. It will be understood that FIG. 1 only illustrates one end anchor support 44 and two intermediate supports 48. The horizontal lifeline system would generally follow the contour of the entire ceiling and would be provided with several intermediate anchor supports like 48 and an end anchor support at the other end of the system. A mobile attachment device 40 is shown by one of the intermediate supports 48. Several mobile attachment devices like device 40 may be located on the horizontal lifeline system. The mobile attachment device 40 freely moves across the horizontal lifeline cable 32 including across intermediate supports 48. A person working in the vicinity of the horizontal lifeline system attaches a safety line to the mobile attachment device 40.

Figure 2:
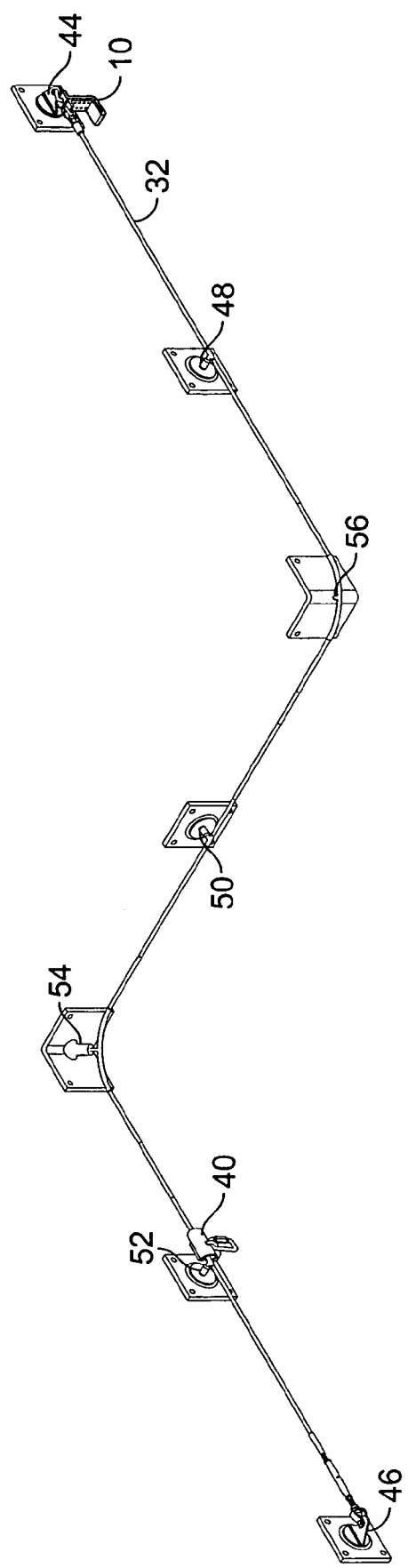
FIG. 2 is an elevational perspective view of a wall mounted horizontal lifeline system showing use of the energy absorber of the present invention.

Referring now to FIG. 2, the energy absorber 10 is shown in use in a horizontal lifeline system such as one employed on a wall (not shown) structure. The horizontal lifeline structure generally comprises end anchor supports 44 and 46, several intermediate anchor supports 48, 50, 52, two corner supports 54, 56, and the horizontal lifeline cable 32. The energy absorber 10 is conventionally secured to one end anchor support 44 in the manner described above. The other end anchor support 46 is provided with a conventional tensioner 58 for securing and tensioning the horizontal lifeline cable 32 to said end anchor support 46. A mobile attachment device 40 is shown near intermediate support 52. The mobile attachment device 40 freely moves across the horizontal lifeline cable 32 including across the aforesaid intermediate and corner supports. A person working in the vicinity of the horizontal lifeline system attaches a safety line to the mobile attachment device 40.

Figure 4:
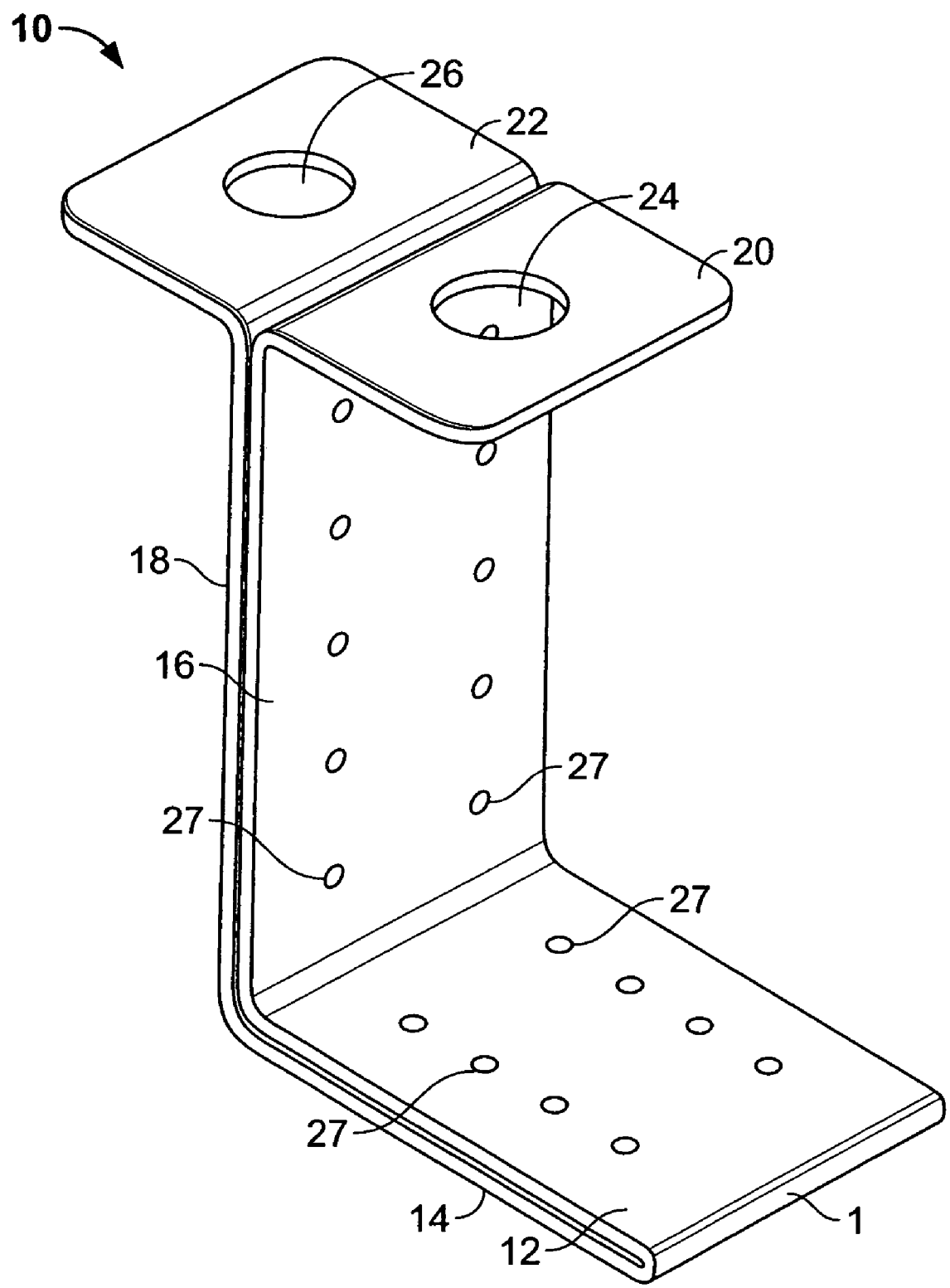
FIG. 4 is a view of the elongated folded plate portion of the energy absorber of the present invention without the fasteners.

As indicated in FIG. 4, the folded plate 1 of the energy absorber 10 is shown before application of the fasteners (not shown). Adjoining lower walls 12 and 14 and adjoining intermediate walls 16 and 18 are provided with two parallel rows of apertures 27 for receiving the fasteners. Optionally, three parallel rows of apertures on each of adjoining lower walls 12 and 14 and adjoining intermediate walls 16 and 18 may be provided. Opposed flanges 20 and 22 are in perpendicular relationship to the intermediate walls 16 and 18. The opposed flanges 20 and 22 are provided with apertures 24 and 26.

Figure 5:
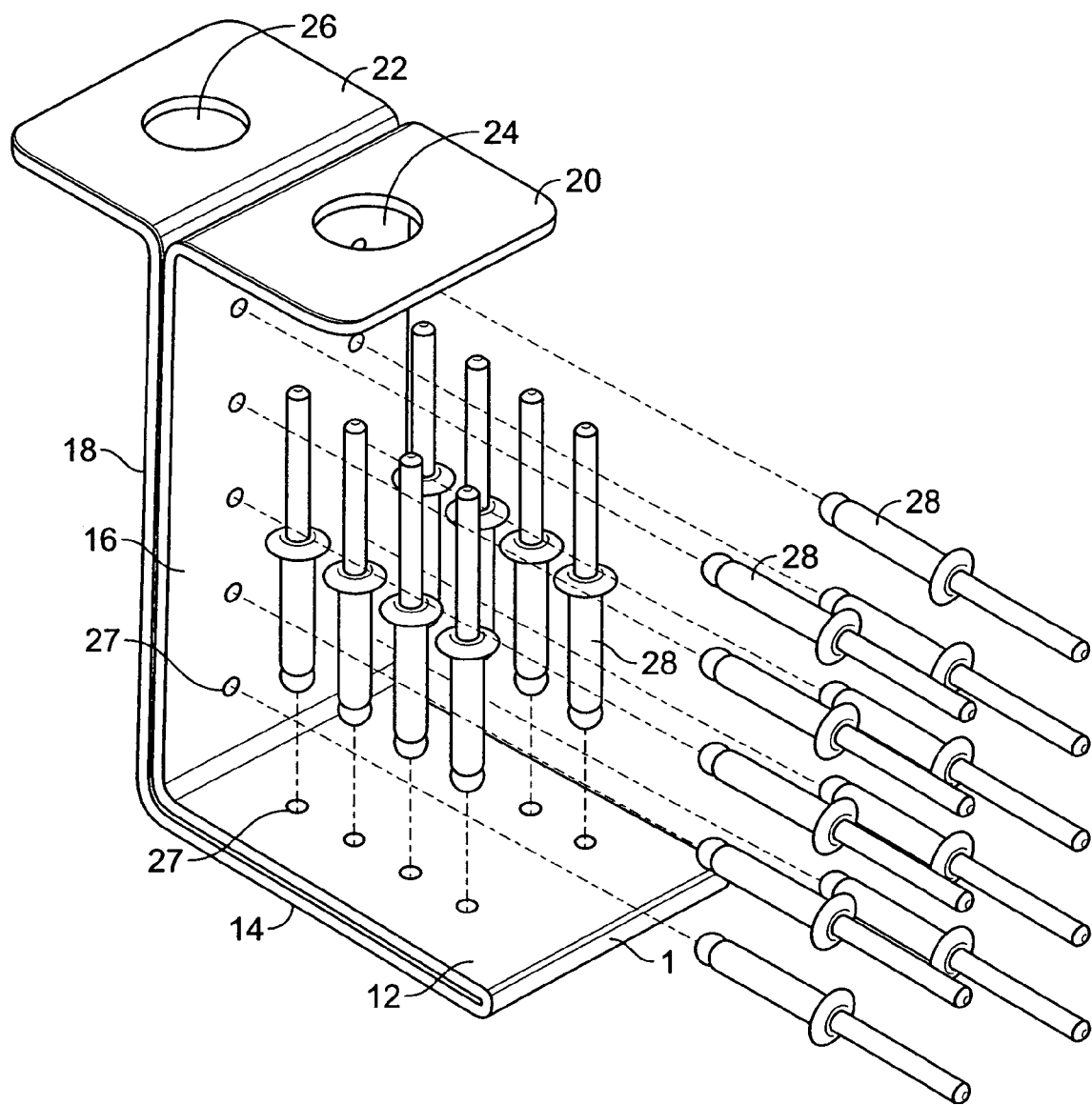
FIG. 5 is a view of the elongated folded plate of the energy absorber of the present invention showing where the fasteners will be applied.
Figure 6:
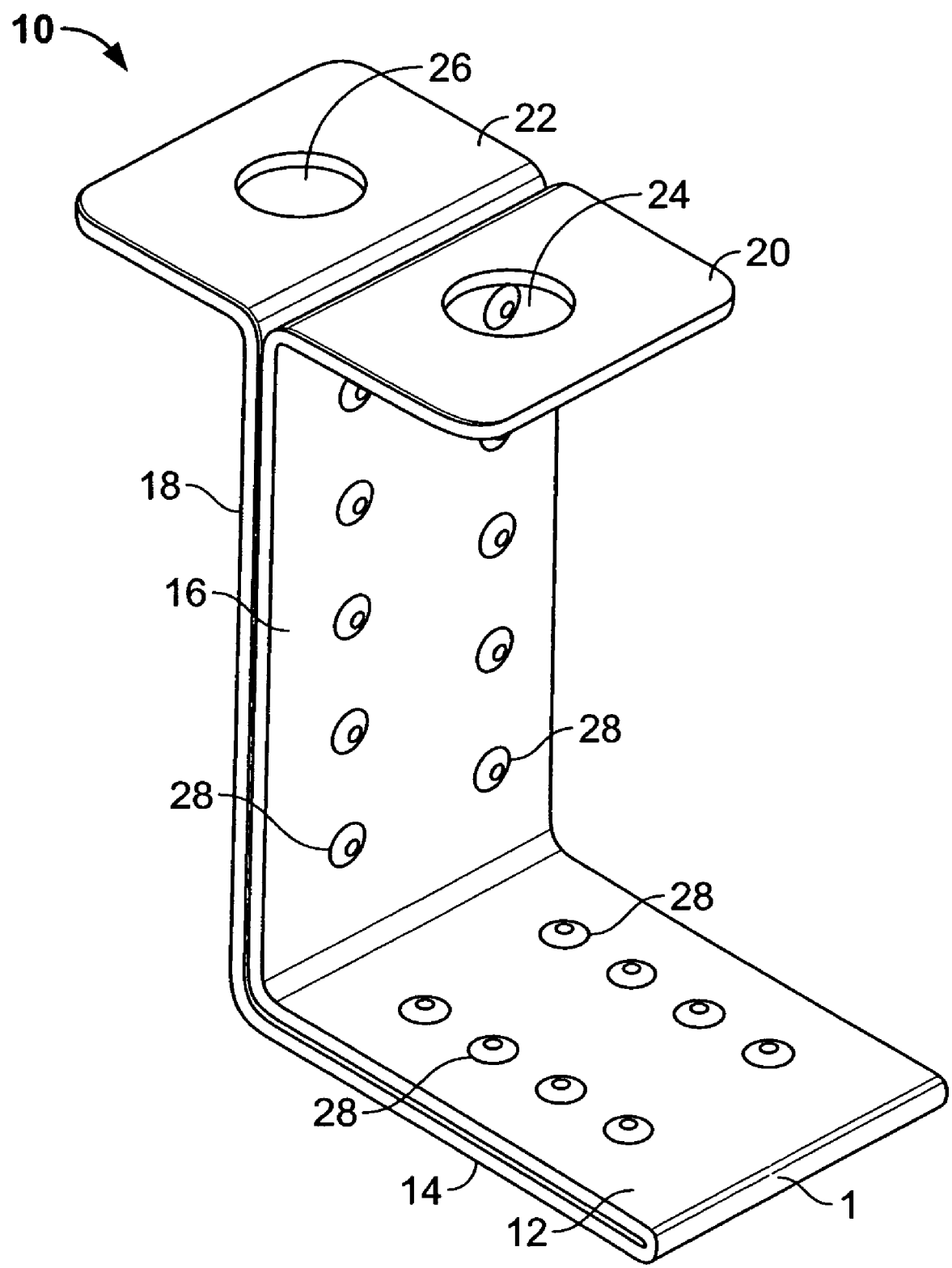
FIG. 6 is the energy absorber of the present invention.

The application of metal rivets 28 through apertures 27 of the folded plate 1 forming the energy absorber 10 is shown in FIG. 5. Adjoining lower walls 12 and 14 and adjoining intermediate walls 16 and 18 are provided with two parallel rows of apertures for receiving the fasteners 28. Optionally, three parallel rows of apertures on each of adjoining lower walls 12 and 14 and adjoining intermediate walls 16 and 18 may be provided. Opposed flanges 20 and 22 are in perpendicular relationship to the intermediate walls 16 and 18. The opposed flanges 20 and 22 are provided with apertures 24 and 26.

The energy absorber 10 is preferably made of corrosion resistant metal such as stainless steel. Optionally, the energy absorber may be additionally coated with a corrosion resistant coating such as a polymer coating.

The various components of the energy absorber described above may be tailored (choice of materials, size, etc.) by persons of ordinary skill in the art to meet different energy absorption needs, using mechanical principles well known to such persons, which are accordingly not set out in detail herein.

The embodiments of the invention in which an exclusive property or privilege is claimed are defined as follows:

1. An energy absorber for use in a horizontal lifeline system comprising;
   an elongated non-elastic plate folded onto itself to form adjoining walls, said adjoining walls having a bend formed therein to form adjoining lower walls and adjoining intermediate walls perpendicular to the said lower walls, said plate having opposed flanges in perpendicular relationship to said adjoining intermediate walls;
   means for attaching one said opposing flange to a first object;
   means for attaching second said opposing flange to a second object;
   wherein the adjoining lower walls and adjoining intermediate walls are secured together with at least two parallel rows of corrosion resistant metal rivets such that when a tension shock load acts in the longitudinal direction of one of the opposed flanges, the rivets deform, pull apart and fracture, and the plate transforms into an unfolded state.

2. An energy absorber according to claim 1 wherein the first object is the horizontal lifeline cable and the second object is an end anchor of the horizontal lifeline system.

3. An energy absorber according to claim 2 wherein the attaching means are apertures on the opposing flanges for receiving connecting devices of the horizontal lifeline cable and the end anchor of the horizontal lifeline system.

4. An energy absorber according to claim 3 wherein the plate is made of corrosion resistant metal.

5. An energy absorber according to claim 3 wherein the device is coated with a corrosion resistant coating.

6. An energy absorber according to claim 4 wherein the device is coated with a corrosion resistant coating.

7. An energy absorber for use in a horizontal lifeline system comprising:
   an elongated non-elastic plate securely folded onto itself to form conjoined walls, said conjoined walls having a bend formed therein to form a conjoined lower wall portion and a conjoined intermediate wall portion perpendicular to the said conjoined lower wall portion, said plate having opposed upper wall portions in perpendicular relationship to the conjoined intermediate wall portion;
   connection means in one upper wall portion for receiving and securing a fixed connection to an end anchor of the horizontal lifeline system;
   connection means in the other upper wall portion for receiving and securing a fixed connection to the horizontal lifeline of the horizontal lifeline system;
   wherein the conjoined lower wall portion and the conjoined intermediate wall portion are secured together with at least two parallel rows of corrosion resistant metal rivets such that when tension shock load acts in the longitudinal direction of one of the opposed upper wall portions, the rivets deforms, pull apart and fracture and the secured plate pulls apart and transforms into an unfolded state.

8. An energy absorber for use in a horizontal lifeline system comprising;
   an elongated non-elastic plate folded onto itself to form adjoining walls, said adjoining walls having a bend formed therein to form adjoining lower wall portions and adjoining intermediate wall portions perpendicular to the said lower wall portions, said plate having opposed flanges in perpendicular relationship to said adjoining intermediate wall portions;
   said opposing flanges having means for receiving connecting devices of the horizontal lifeline cable and an end anchor of the horizontal lifeline system;
   wherein the adjoining lower wall portions and adjoining intermediate wall portions are secured together with at least two parellel rows of corrosion resistant metal rivets such that when a tension shock load produced in the horizontal lifeline cable by arresting a fall acts in the longitudinal direction of one of the opposed flanges, the rivets deform, pull apart and fracture, and the plate transforms into an unfolded state.

* * * * *